(12) United States Patent
Lee et al.

(10) Patent No.: US 10,623,769 B2
(45) Date of Patent: *Apr. 14, 2020

(54) METHOD AND APPARATUS FOR PERFORMING INTRA-PREDICTION USING ADAPTIVE FILTER (71) Applicant: Electronics and Telecommunications Research Institute, Daejeon (KR)

(72) Inventors: Jin Ho Lee, Daejeon (KR); Hui Yong Kim, Daejeon (KR); Se Yoon Jeong, Daejeon (KR); Suk Hee Cho, Daejeon (KR); Ha Hyun Lee, Seoul (KR); Jong Ho Kim, Daejeon (KR); Sung Chang Lim, Daejeon (KR); Jin Soo Choi, Daejeon (KR); Jin Woong Kim, Daejeon (KR); Chie Teuk Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,459

(22) Filed: Aug. 7, 2018

(65) Prior Publication Data
US 2018/0352250 A1 Dec. 6, 2018

Related U.S. Application Data (63) Continuation of application No. 15/798,024, filed on Oct. 30, 2017, now Pat. No. 10,075,734, which is a
(Continued)

(30) Foreign Application Priority Data

Apr. 9, 2010 (KR) .................. 10-2010-0032778
Mar. 23, 2011 (KR) .................. 10-2011-0026079
Apr. 8, 2011 (KR) .................. 10-2011-0032766

(51) Int. Cl.
H04N 19/176 (2014.01)
H04N 19/44 (2014.01)
(Continued)

(52) U.S. Cl.
CPC ......... *H04N 19/593* (2014.11); *H04N 19/105* (2014.11); *H04N 19/117* (2014.11);
(Continued)

(58) Field of Classification Search
CPC .................. H04N 19/593; H04N 19/105
See application file for complete search history.

(56) References Cited

U.S. PATENT DOCUMENTS 5,621,467 A * 4/1997 Chien ................. H04N 19/895
375/240.15
7,379,499 B2 5/2008 Dahlhoff et al.
(Continued)

FOREIGN PATENT DOCUMENTS

CN 101163249 A 4/2008
EP 1845732 A2 10/2007
(Continued)

OTHER PUBLICATIONS

Hui Yong Kim et al., "Description of video coding technology proposal by ETRI," Joint Collaborative Team on Video Coding (JCT-VC) of ITU-T SG16 WP3 and ISO/IEC JTC1/SC29/WG11, Apr. 15-23, 2010, pp. 1-37, ETRI (Electronics and Telecommunications Research Institute), 1st Meeting: Dresden, DE.
(Continued)

*Primary Examiner* — Irfan Habib
(74) *Attorney, Agent, or Firm* — Michael Best & Friedrich LLP (57) ABSTRACT

Provided is a method and apparatus for performing intra-prediction using an adaptive filter. The method for performing intra-prediction includes the steps of: determining
(Continued)

whether or not to apply a first filter for a reference pixel value on the basis of information of a neighboring block of a current block; applying the first filter for the reference pixel value when it is determined to apply the first filter; performing intra-prediction on the current block on the basis of the reference pixel value; determining whether or not to apply a second filter for a prediction value according to each prediction mode of the current block, which is predicted by the intra-prediction performance on the basis of the information of the neighboring block; and applying the second filter for the prediction value according to each prediction mode of the current block when it is determined to apply the second filter.

5 Claims, 8 Drawing Sheets

Related U.S. Application Data continuation of application No. 15/433,890, filed on Feb. 15, 2017, now Pat. No. 9,838,711, which is a continuation of application No. 14/823,638, filed on Aug. 11, 2015, now Pat. No. 9,661,345, which is a continuation of application No. 13/640,014, filed as application No. PCT/KR2011/002514 on Apr. 11, 2011, now Pat. No. 9,549,204.

(51) Int. Cl.
| | |
|---|---|
| *H04N 19/593* | (2014.01) |
| *H04N 19/117* | (2014.01) |
| *H04N 19/157* | (2014.01) |
| *H04N 19/82* | (2014.01) |
| *H04N 19/136* | (2014.01) |
| *H04N 19/105* | (2014.01) |
| *H04N 19/182* | (2014.01) |
| *H04N 19/147* | (2014.01) |

(52) U.S. Cl.
CPC ......... *H04N 19/136* (2014.11); *H04N 19/157* (2014.11); *H04N 19/176* (2014.11); *H04N 19/44* (2014.11); *H04N 19/82* (2014.11); *H04N 19/147* (2014.11); *H04N 19/182* (2014.11)

(56) References Cited

U.S. PATENT DOCUMENTS

| | | | |
|---|---|---|---|
| 8,218,629 B2 | 7/2012 | Lee et al. | |
| 8,619,857 B2* | 12/2013 | Zhao | H04N 19/50 |
| | | | 375/240.12 |
| 8,630,350 B2 | 1/2014 | Wang et al. | |
| 8,644,375 B2* | 2/2014 | Segall | H04N 19/436 |
| | | | 375/240 |
| 9,008,175 B2 | 4/2015 | Auwera et al. | |
| 9,100,621 B2* | 8/2015 | Jeon | H04N 19/159 |
| 9,154,781 B2* | 10/2015 | Lee | H04N 19/105 |
| 9,225,981 B2* | 12/2015 | Lee | H04N 19/105 |
| 9,258,573 B2 | 2/2016 | Drugeon et al. | |
| 9,307,246 B2 | 4/2016 | Oh et al. | |
| 9,319,715 B2* | 4/2016 | Oh | H04N 19/159 |
| 9,332,262 B2* | 5/2016 | Lee | H04N 19/105 |
| 9,374,600 B2 | 6/2016 | Guo et al. | |
| 9,407,911 B2* | 8/2016 | Hong | H04N 19/51 |
| 9,432,699 B2 | 8/2016 | Lainema et al. | |
| 9,445,127 B2* | 9/2016 | Kim | H04N 19/82 |
| 9,451,254 B2* | 9/2016 | Joshi | H04N 19/176 |
| 9,467,692 B2 | 10/2016 | Rapaka et al. | |
| 9,554,130 B2* | 1/2017 | Lee | H04N 19/196 |
| 9,554,154 B2* | 1/2017 | Oh | H04N 19/159 |
| 9,615,086 B2* | 4/2017 | Jeon | H04N 19/176 |
| 9,615,110 B2* | 4/2017 | Kim | H04N 19/82 |
| 9,661,332 B2* | 5/2017 | Jeon | H04N 19/159 |
| 9,674,521 B2* | 6/2017 | Lee | H04N 19/593 |
| 9,838,718 B2* | 12/2017 | Van der Auwera | |
| | | | H04N 19/176 |
| 9,877,007 B2* | 1/2018 | Cho | H04N 19/176 |
| 9,883,191 B2* | 1/2018 | Lee | H04N 19/593 |
| 9,900,618 B2* | 2/2018 | Lee | H04N 19/105 |
| 9,918,086 B2* | 3/2018 | Oh | H04N 19/11 |
| 9,955,171 B2* | 4/2018 | Tsukuba | H04N 19/159 |
| 10,205,964 B2 | 2/2019 | Lee et al. | |
| 2004/0136458 A1* | 7/2004 | Dahlhoff | H04N 19/61 |
| | | | 375/240.12 |
| 2006/0268991 A1* | 11/2006 | Segall | H04B 1/66 |
| | | | 375/240.24 |
| 2007/0206872 A1* | 9/2007 | Song | H04N 19/176 |
| | | | 382/236 |
| 2007/0253483 A1* | 11/2007 | Lee | H04N 19/176 |
| | | | 375/240.12 |
| 2008/0089417 A1* | 4/2008 | Bao | H04N 19/176 |
| | | | 375/240.16 |
| 2008/0225952 A1* | 9/2008 | Wang | H04N 19/105 |
| | | | 375/240.16 |
| 2009/0252221 A1 | 10/2009 | Park et al. | |
| 2009/0310677 A1* | 12/2009 | Shiodera | H04N 19/70 |
| | | | 375/240.15 |
| 2010/0061650 A1 | 3/2010 | Rai et al. | |
| 2010/0239002 A1* | 9/2010 | Park | H04N 19/176 |
| | | | 375/240.12 |
| 2011/0026599 A1* | 2/2011 | Andersson | H04N 19/176 |
| | | | 375/240.16 |
| 2011/0038415 A1* | 2/2011 | Min | H04N 19/115 |
| | | | 375/240.12 |
| 2011/0176614 A1* | 7/2011 | Sato | H04N 19/105 |
| | | | 375/240.16 |
| 2011/0261880 A1 | 10/2011 | Auyeung | |
| 2011/0280304 A1* | 11/2011 | Jeon | H04N 19/105 |
| | | | 375/240.12 |
| 2012/0082224 A1* | 4/2012 | Van Der Auwera | |
| | | | H04N 19/176 |
| | | | 375/240.12 |
| 2013/0016774 A1 | 1/2013 | Oh | |
| 2013/0101032 A1* | 4/2013 | Wittmann | H04N 19/176 |
| | | | 375/240.12 |
| 2014/0185680 A1* | 7/2014 | Li | H04N 19/597 |
| | | | 375/240.16 |
| 2014/0219339 A1 | 8/2014 | Park | |
| 2015/0023405 A1* | 1/2015 | Joshi | H04N 19/176 |
| | | | 375/240.02 |
| 2015/0117531 A1* | 4/2015 | Kim | H04N 19/82 |
| | | | 375/240.12 |
| 2015/0124880 A1* | 5/2015 | Kim | H04N 19/82 |
| | | | 375/240.12 |
| 2015/0131722 A1 | 5/2015 | Guo et al. | |
| 2018/0332303 A1* | 11/2018 | Young | H04N 19/593 |

FOREIGN PATENT DOCUMENTS

| | | | |
|---|---|---|---|
| EP | 2600613 A2 | 6/2013 | |
| EP | 2600614 A2 | 6/2013 | |
| JP | 2005510985 A | 4/2005 | |
| JP | 2005512419 A | 4/2005 | |
| JP | 2006005438 A | 1/2006 | |
| JP | 2006229411 A | 8/2006 | |
| JP | 2007252256 A | 10/2007 | |
| JP | 2007288785 A | 11/2007 | |
| JP | 2008061044 A | 3/2008 | |
| JP | 2009284298 A | 12/2009 | |
| JP | 2010035137 A | 2/2010 | |
| JP | 2013524681 A | 6/2013 | |
| JP | 2014207683 A | 10/2014 | |
| JP | 2014207684 A | 10/2014 | |
| JP | 2014207685 A | 10/2014 | |
| KR | 1019920008629 A | 5/1992 | |
| KR | 1020050090451 A | 9/2005 | |
| KR | 1020090079894 A | 7/2009 | |

(56) References Cited

FOREIGN PATENT DOCUMENTS

| KR | 1020090095014 A | 9/2009 |
|---|---|---|
| WO | 2008012918 A1 | 1/2008 |
| WO | 2010001918 A1 | 1/2010 |
| WO | 2011021839 A2 | 2/2011 |
| WO | 2012134085 A2 | 10/2012 |

OTHER PUBLICATIONS

Jingli Zhou et al., "An Interpolation Method by Predicting the Direction of Pixel Texture Changing Trend for H.264/AVC Intra Prediction," Second International Symposium on Intelligent Information Technology Application (IITA '08), IEEE, Dec. 2008, vol. 1, pp. 884-888, China.

Kazuo Sugimoto et al., "CE6.f: LUT-based Adaptive Filtering on Intra Prediction Samples," Joint Collaborative Team on Video Coding (JCT-VC) of ITU-T SG16 WP3 and ISO/IEC JTC1/SC29/WG11, Jan. 20-28, 2011, Mitsubishi Electric Corporation and NHK (Japan Broadcasting Corporation), 5th Meeting: Geneva, CH.

Kazuo Sugimoto et al., "CE6.f: Verification Report on LUT-based Adaptive Filtering on Intra Prediction Samples," Joint Collaborative Team on Video Coding (JCT-VC) of ITU-T SG16 WP3 and ISO/IEC JTC1/SC29/WG11, Mar. 16-23, 2011, Mitsubishi Electric Corporation and NHK (Japan BroadCasting Corporation), 5th Meeting: Geneva, CH.

Mathias Wien, "Variable Block-Size Transforms for H.264/AVC," IEEE Transactions on Circuits and Systems for Video Technology, Jul. 1, 2003, pp. 604-613, vol. 13, No. 7, IEEE Service Center, Piscataway, NJ, USA.

Shay Har-Noy et al., "Adaptive In-Loop Prediction Refinement for Video Coding," Multimedia Signal Processing, 2007. MMSP 2007. IEEE 9th Workshop on, Oct. 1, 2007, pp. 171-174, IEEE, Piscataway, NJ, USA.

Yunfei Zheng et al., "Simplified Intra Smoothing," Joint Collaborative Team on Video Coding (JCT-VC) of ITU-T SG16 WP3 and ISO/IEC JTC1/SC29/WG11, Oct. 7-15, 2010, Qualcomm Inc., 3rd Meeting: Guangzhou, CN.

Yunfei Zheng, "CE13: Mode Dependent Hybrid Intra Smoothing," Joint Collaborative Team on Video Coding (JCT-VC) of ITU-T SG16 WP3 and ISO/IEC JTC1/SC29/WG11, Jan. 20-28, 2011, pp. 1-5, Qualcomm, 4th Meeting: Daegu, KR.

Hui Yong Kim et al., "Description of video coding technology proposal by ETRI", Joint Collaborative Team on Video Coding (JCT-VC) of ITU-T SG16 WP3 and ISO/IEC JTC1/SC29/WG11, Apr. 15-23, 2010, pp. 1-37, ETRI (Electronics and Telecommunications Research Institute), Dresden, DE.

Iain E. G. Richardson, H.264 and MPEG-4 Video compression: Video Coding for Next-generation Multimedia, H.264/MPEG-4 Part 10, Sep. 2, 2003, pp. 159-223, Chapter 6, John Wiley & Sons, Ltd.

International Telecommunication Union, "Advanced video coding for generic audiovisual services," ITU-T Recommendation H.264, ITU-T, 2005, pp. 125-126.

Sugimoto et al., "LUT-based adaptive filtering on intra prediction samples," Joint Collaborative Team on Video Coding (JCT-VC) of ITU-T SG16 WP3 and ISO/IEC JTC1/SC29/WG11, 4th Meeting: Daegu, KR, 2011, pp. 1-4.

* cited by examiner

| M | A | B | C | D | E | F | G | H |
|---|---|---|---|---|---|---|---|---|
| I | a | b | c | d |   |   |   |   |
| J | e | f | g | h |   |   |   |   |
| K | i | j | k | l |   |   |   |   |
| L | m | n | o | p |   |   |   |   |

FIG. 4A 0 (vertical)

FIG. 4B 1 (horizontal)

FIG. 4C 2 (DC)

FIG. 4D 3 (diagonal down-left)

FIG. 4E 4 (diagonal down-right)

FIG. 4F 5 (vertical-right)

FIG. 4G 6 (horizontal-down)

FIG. 4H 7 (vertical-left)

FIG. 4I 8 (horizontal-up)

| Z | A | B | C | D | E | F | G | H | I | J | K | L | M | N | O | P |
|---|---|---|---|---|---|---|---|---|---|---|---|---|---|---|---|---|
| Q | a1 | b1 | c1 | d1 | e1 | f1 | g1 | h1 | | | | | | | | |
| R | a2 | b2 | c2 | d2 | e2 | f2 | g2 | h2 | | | | | | | | |
| S | a3 | b3 | ⋮ | ⋮ | ⋮ | ⋮ | ⋮ | ⋮ | | | | | | | | |
| T | a4 | b4 | ⋮ | ⋮ | ⋮ | ⋮ | ⋮ | ⋮ | | | | | | | | |
| U | a5 | b5 | ⋮ | ⋮ | ⋮ | ⋮ | ⋮ | ⋮ | | | | | | | | |
| V | a6 | b6 | ⋮ | ⋮ | ⋮ | f6 | g6 | h6 | | | | | | | | |
| W | a7 | b7 | ⋮ | ⋮ | ⋮ | f7 | g7 | h7 | | | | | | | | |
| X | a8 | b8 | ⋮ | ⋮ | ⋮ | f8 | g8 | h8 | | | | | | | | |

FIG. 8

METHOD AND APPARATUS FOR PERFORMING INTRA-PREDICTION USING ADAPTIVE FILTER

CROSS-REFERENCE TO RELATED APPLICATIONS

The present application is a continuation application of U.S. application Ser. No. 15/798,024, filed on Oct. 30, 2017, which is incorporated herein by reference in its entirety.

TECHNICAL FIELD

The present invention relates to video coding, and more particularly, to a method and apparatus for performing intra-prediction by applying an adaptive filter to the surrounding pixel values of a block to be predicted or the predicted pixel values of a current block.

BACKGROUND ART

With the recent advent of digital TV, etc., technology in the broadcasting TV and home entertainment fields are abruptly being developed. Technology of the fields is being commercialized by the standardization of video compression technology. For video compression, an ITU-T (International Telecommunications Union-Telecommunication) H. 263 standard is being widely used. MPEG-4 which is the next standard of MPEG (Motion Picture Experts Group) is being used for Internet-based video applications.

After the H. 263 standard was completed, ITU-T VCEG (Video Coding Experts Group) has devoted itself to achieve a short-term target for adding additional characteristics to the H. 263 standard and a long-term target for developing a new standard for visual communication of a low bit rate. In the year of 2001, JVT (Joint Video Team) consisting of the experts of MPEG and VCEG was constructed, and the JVT has performed a standardization task of ITU-T H. 264/MPEG-4 part 10 which is a new standard for the coding of video. The H. 264 standard may also be called AVC (Advanced Video Coding). The technological target of the H. 264/AVC is for the significant improvement of coding efficiency, coding technology robust to loss and error, network-friendly coding technology, low latency capability, accurate match decoding, and so on.

Most of surrounding pixels within video have similar values. The same principle applies to 4×4 blocks or 16×16 blocks which are a minimum block size of the H. 264/AVC standard. Prediction for the video may be performed using the likeness between inter-block values as described above, and a difference between the video and an original video can be encoded. This is called intra-prediction. The efficiency of video coding can be increased by intra-prediction.

Furthermore, in performs intra-prediction, a filter may be applied before the intra-prediction is performed. In typical cases, when intra-prediction is performed in the H. 264/AVC standard, a filter is applied to reference pixel values, and the values to which the filter has been applied are used for the intra-prediction. However, the performance of video coding may be increased when the intra-prediction is performed without applying the filter rather than when the intra-prediction is performed after the filter is applied, according to circumstances.

Accordingly, there may be proposed a method of determining whether to apply a filter when performing intra-prediction.

SUMMARY OF INVENTION

Technical Problem

An object of the present invention is to provide a method and apparatus for performing intra-prediction by applying an adaptive filter to surrounding pixel values of a block to be predicted or the predicted pixel values of a current block in video encoding. More particularly, after an adaptive filter (i.e., a pre-filter) is applied to reference pixel values of a current block for performing intra-prediction, prediction is performed. Furthermore, a residual signal is calculated after applying an adaptive filter (i.e., a post-filter) to the pixel values of a predicted current block.

Technical Solution

In an aspect, there is provided a method of performing intra-prediction. The method of performing intra-prediction includes determining whether to apply a first filter to a reference pixel value based on information about surrounding blocks of a current block, if, as a result of the determination, the first filter is determined to be applied, applying the first filter to the reference pixel values, performing intra-prediction for the current block based on the reference pixel value, determining whether to apply a second filter to a prediction value for each prediction mode of the current block, predicted by performing the intra-prediction based on the information about the surrounding blocks, and if, as a result of the determination, the second filter is determined to be applied, applying the second filter to the prediction values for each prediction mode.

Whether to apply the first filter may be determined based on the prediction mode of the current block determined based on the information about the surrounding blocks.

Whether to apply the first filter may be determined based on the size of the current block.

Whether to apply the first filter may be previously designated based on the prediction mode of the current block and the size of the current block.

Whether to apply the first filter may be determined based on whether the surrounding blocks have been subjected to intra-frame coding or inter-frame coding.

The first filter may be at least any one of a 3-tap filter and a 2-tap filter.

Whether to apply the second filter may be determined based on the prediction mode of the current block determined based on the information about the surrounding blocks.

Whether to apply the second filter may be determined based on the size of the current block.

Whether to apply the second filter may be determined based on whether the surrounding blocks have been subjected to intra-frame encoding or inter-frame encoding.

The second filter may be applied to prediction values of pixels adjacent to the boundary of the reference pixel value.

The second filter may be at least any one of a 3-tap filter and a 2-tap filter.

In another aspect, there is a provided encoder. The encoder includes a processor and memory connected to the processor and configured to store pieces of information for driving the processor. The processor is configured to determine whether to apply a first filter to a reference pixel value based on information about surrounding blocks of a current block, if, as a result of the determination, the first filter is determined to be applied, apply the first filter to the reference pixel value, perform intra-prediction for the current block based on the reference pixel value, determine whether to apply a second filter to a prediction value for each prediction mode of the current block, predicted by performing the intra-prediction based on the information about the surrounding blocks, and if, as a result of the determination, the second filter is determined to be applied, apply the second filter to the prediction value for each prediction mode.

In yet another aspect, there is a provided decoder. The decoder includes a processor and memory connected to the processor and configured to store pieces of information for driving the processor. The processor is configured to determine whether to apply a first filter to a reference pixel value based on information about surrounding blocks of a current block, if, as a result of the determination, the first filter is determined to be applied, apply the first filter to the reference pixel value, perform intra-prediction for the current block based on the reference pixel value, determine whether to apply a second filter to a prediction value for each prediction mode of the current block, predicted by performing the intra-prediction based on the information about the surrounding blocks, and if, as a result of the determination, the second filter is determined to be applied, apply the second filter to the prediction value for each prediction mode.

Advantageous Effects

The performance of coding is improved by effectively predicting a luminance or chrominance signal block to be encoded.

MODE FOR INVENTION

Hereinafter, embodiments of the present invention are described in detail with reference to the accompanying drawings in order for those skilled in the art to be able to readily implement the present invention. However, the present invention may be implemented in various different ways and are not limited to the following embodiments. In order to clarify a description of the present invention, parts not related to the description are omitted, and similar reference numbers are used throughout the drawings to refer to similar parts. Furthermore, a description of parts which can be readily understood by those skilled in the art is omitted.

Furthermore, when it is said that any part "includes (or comprises)" any element, it means that the corresponding part may further include other elements unless otherwise described without excluding the elements.

Figure 1:
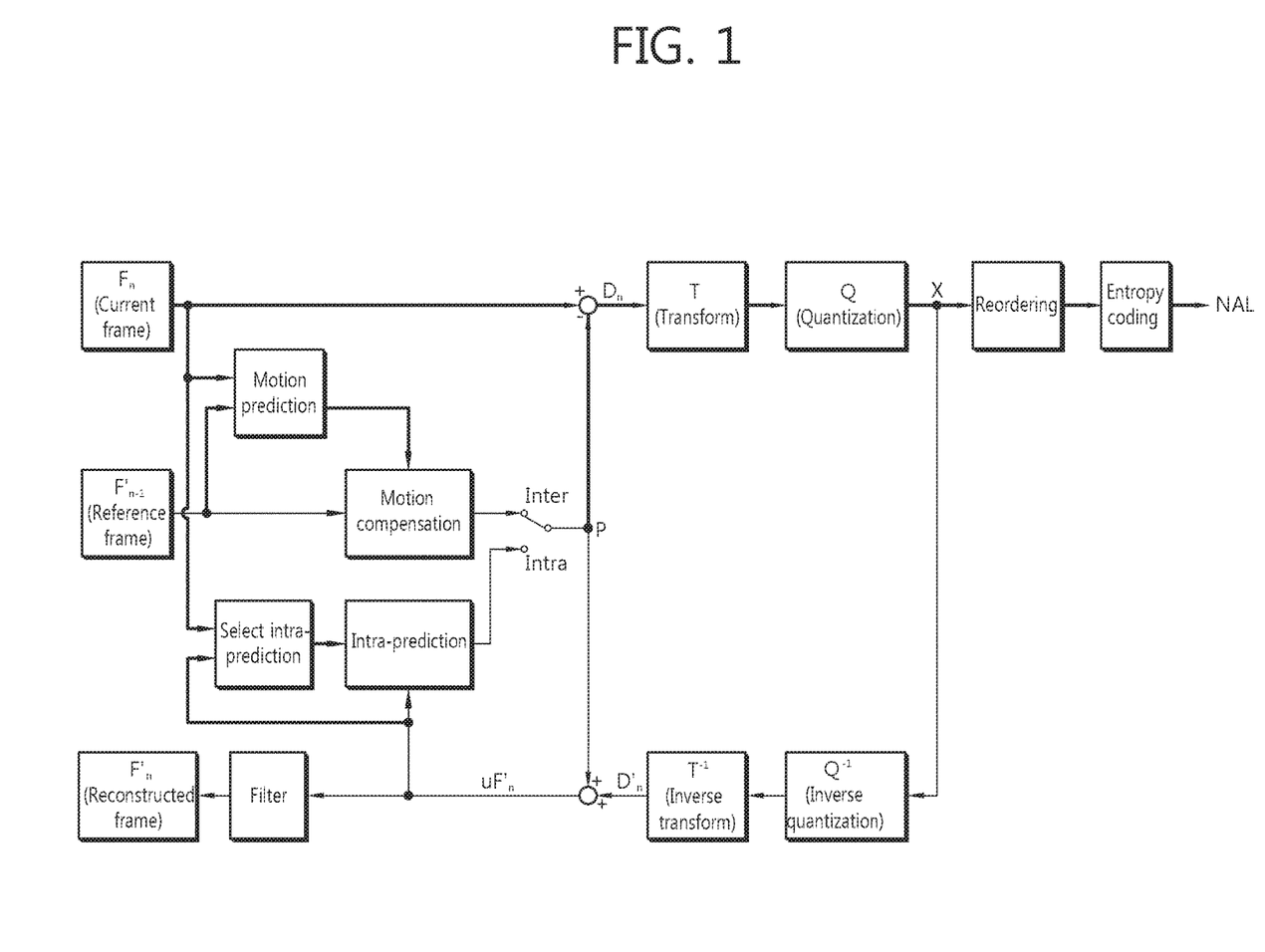
FIG. 1 is a block diagram of an encoder according to the H. 264/AVC (Advanced Video Coding) standard.

FIG. 1 is a block diagram of an encoder according to the H. 264/AVC (Advanced Video Coding) standard.

Referring to FIG. 1, the encoder includes two kinds of data flow paths. One of them is a forward path, and the other thereof is a reconstruction path.

First, the forward path is described. Encoding is performed for an input frame $F_n$ for each macroblock. The macroblock has the size of 16×16 pixels in an original video. Intra-prediction or inter-prediction is performed for each input frame. In the intra-prediction, prediction is performed using a likeness between inter-block values within the frame, and a difference between the original video and a relevant video is encoded. In the inter-prediction, prediction is performed using a likeness between inter-block values between frames, and a difference between the original video and a relevant video is encoded. At the time of the intra-prediction or the inter-prediction, P (i.e., a prediction macroblock) is formed on the basis of the reconstructed frame. At the time of the intra-prediction, the prediction macroblock P may be formed from samples within a previously encoded current frame, a decoded current frame, or a reconstructed current frame $uF_n'$. When the prediction macroblock P is formed from the reconstructed current frame, unfiltered samples may be used. At the time of the inter-prediction, the prediction macroblock P may be formed from one or more reference frames through motion compensation or motion prediction. In FIG. 1, it is assumed that the reference frame is a previously encoded frame $F_{n-1}'$. However, the present invention is not limited thereto, and each prediction macroblock may be formed from a previous 1 frame or previous 2 frames already encoded or reconstructed, or a subsequent frame or subsequent 2 frames.

P is subtracted from the current macroblock in order to generate a residual or different macroblock $D_n$. The macroblock $D_n$ is transformed (T) using a block transform and quantized (Q), thus generating X. X is a set of encoded coefficients. The encoded coefficients are reordered and then subjected to entropy coding. The entropy-coded coefficients form a compressed bit stream, along with information necessary to decode the macroblock. The compressed bit stream is sent to a Network Abstraction Layer (NAL) for transmission or storage.

The reconstruction path is described below. The quantized macroblock coefficients X are decoded in order to generate a reconstructed frame which is used to encode other macroblocks. X are inverse quantized ($Q^{-1}$) and then inverse transformed ($T^{-1}$), thus generating a macroblock. The difference macroblock $D_n'$ generated in the reconstruction path is not the same as the difference macroblock $D_n$ generated in the forward path. Loss is generated because of the quantization, and thus the macroblock $D_n'$ may have a distorted form of $D_n$. The prediction macroblock P is added to the macroblock $D_n'$, and a reconstruction macroblock $uF_n'$ is generated. The reconstruction macroblock $uF_n'$ may also have a distorted form of the original macroblock Fn. In order to reduce blocking distortion for the reconstruction macroblock $uF_n'$, a filter may be applied. A reconstructed frame may be formed from a plurality of reconstruction macroblocks to which the filter has been applied.

Figure 2:
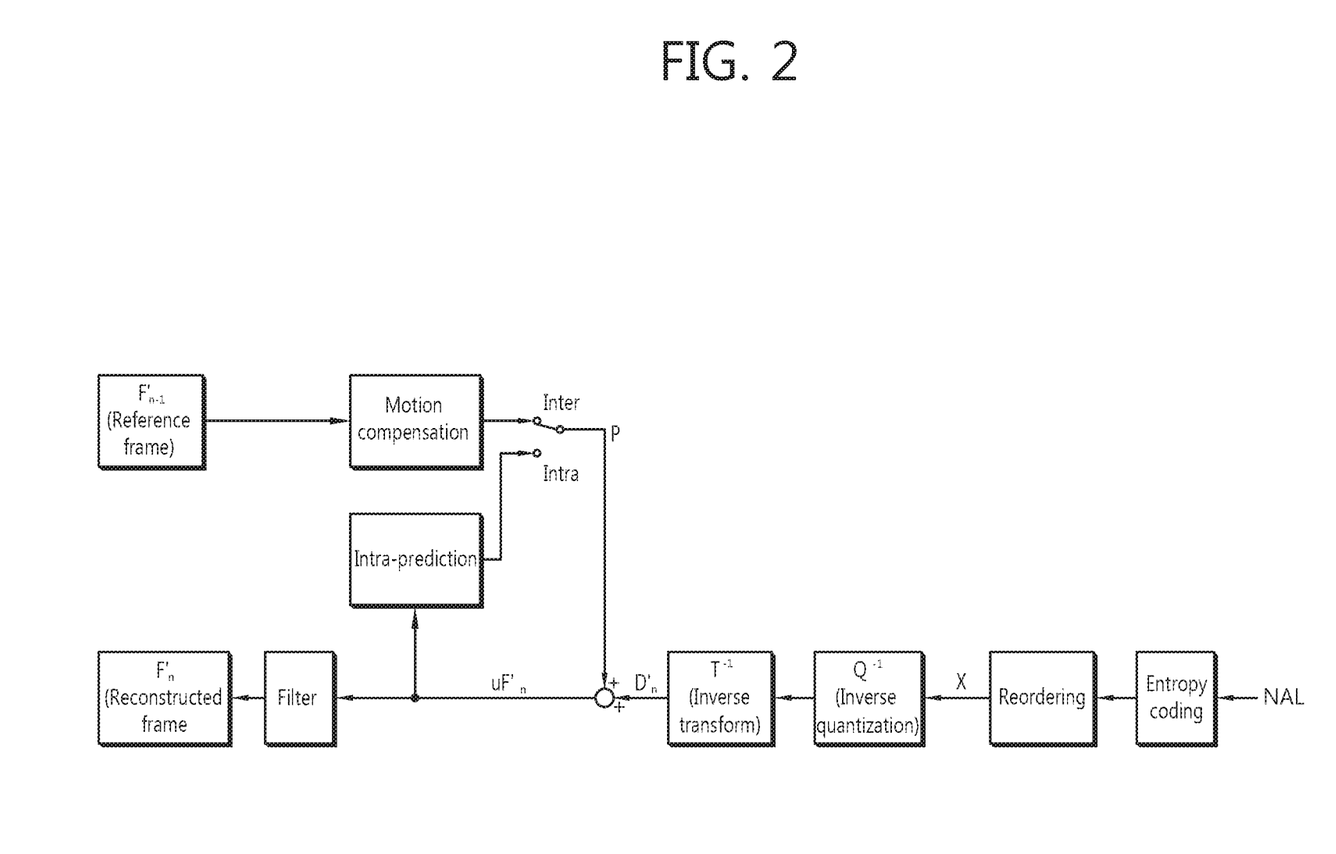
FIG. 2 is a block diagram of a decoder according to the H. 264/AVC standard.

FIG. 2 is a block diagram of a decoder according to the H. 264/AVC standard.

Referring to FIG. 2, the decoder receives a compressed bit stream from an NAL. The received data is subjected to entropy decoding in order to generate a set of quantized coefficients X and then reordered. Inverse quantization and inverse transform are performed for the quantized coefficients X, thereby generating $D_n'$. The decoder generates the same prediction macroblock P as a prediction macroblock, generated at an encoder, using header information decoded from the bit stream. $uF_n'$ is generated by adding $D_n'$ to P, and uFn' may experience a filter, thereby generating a decoded macroblock $F_n'$.

Intra-prediction is described below.

When the intra-prediction is performed for a block (or a macroblock), a prediction block (or a macroblock) P may be formed on the basis of encoded blocks (or macroblocks) or reconstructed blocks (or macroblocks). P is subtracted from an original video, and a difference from which P has been subtracted is encoded and then transmitted. The intra-prediction may be performed according to a luma prediction mode or a chroma prediction mode. In the luma prediction mode, the intra-prediction may be performed in the unit of a 4×4 sub-block size or a 16×16 macroblock size. A total of 9 additional prediction modes exist in the 4×4 luma prediction mode, and a total of 4 additional prediction modes exist in the 16×16 luma prediction mode. The unit in which the intra-prediction is performed is not limited to the sub-block or the macroblock, but may be performed using various sizes as the unit. The unit of a pixel in which the intra-prediction is performed may be called a Coding Unit (CU) or a Prediction Unit (PU). The size of the CU or the PU may be the same as the size of a sub-block or a macroblock as described above.

Figure 3:
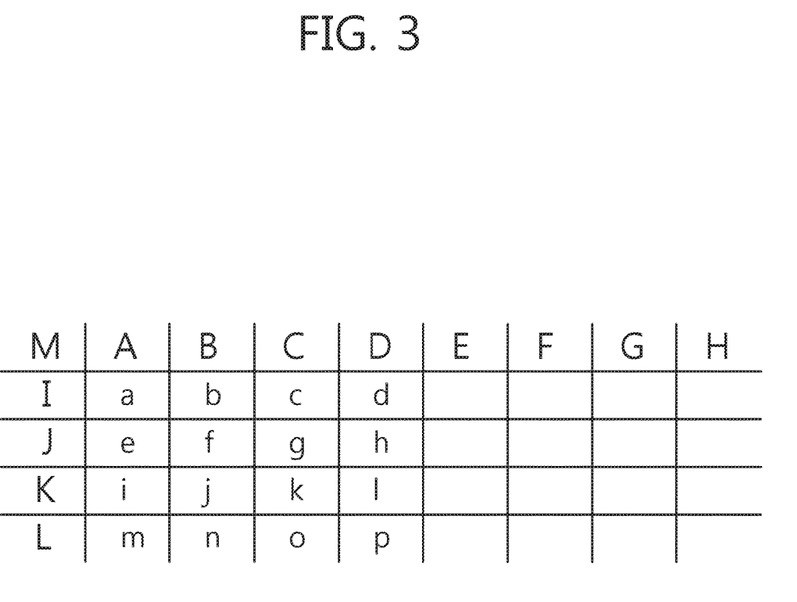
FIG. 3 is a diagram showing an example of labeled prediction samples in a 4×4 luma prediction mode.
Figure 4A:
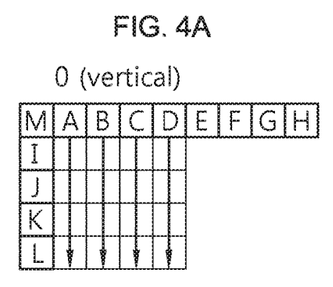
FIGS. 4A to 4I are a diagram showing 9 kinds of prediction modes within the 4×4 luma prediction mode.
Figure 4B:
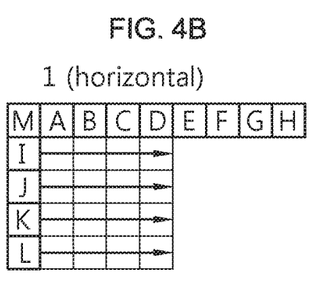
Figure 4C:
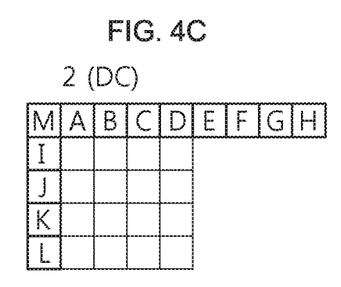
Figure 4D:
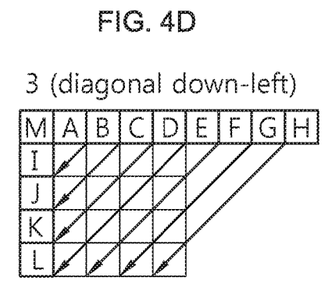
Figure 4E:
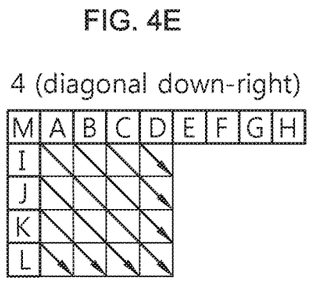
Figure 4F:
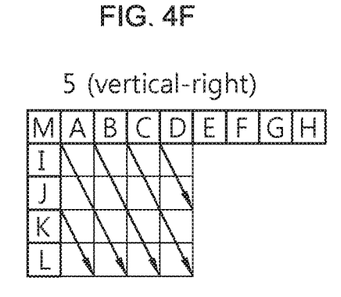
Figure 4G:
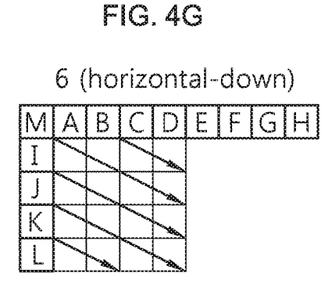
Figure 4H:
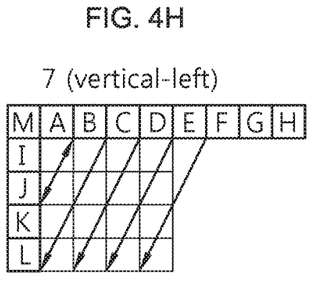
Figure 4I:
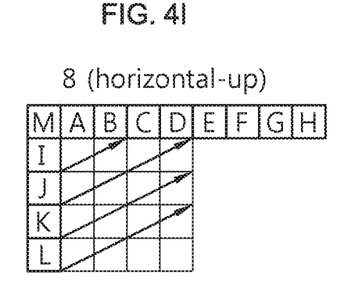

FIG. 3 is a diagram showing an example of labeled prediction samples in the 4×4 luma prediction mode. Referring to FIG. 3, a prediction block P is A to H or I to L and is calculated on the basis of labeled samples.

FIGS. 4A to 4I are a diagram showing 9 kinds of prediction modes within the 4×4 luma prediction mode.

An encoder may select any one of the 9 prediction modes for each block in order to minimize a difference between a prediction block P and a block to be encoded. The 9 prediction modes are as follows:

1) mode 0 (vertical): A to D which are upper samples of the prediction block are vertically extrapolated.
2) mode 1 (horizontal): I to L which are left samples of the prediction block are horizontally extrapolated.
3) mode 2 (DC): all the samples A to D and I to L within the prediction block P are predicted by average.
4) mode 3 (diagonal down-left): samples within the prediction block P are interpolated at an angle of 45° between a left down and a right up.
5) mode 4 (diagonal down-right): samples within the prediction block P are extrapolated right downward at an angle of 45°.
6) mode 5 (vertical-right): samples within the prediction block P are extrapolated or interpolated to the right at an angle of about 26.6° in a vertical axis.
7) mode 6 (horizontal-down): samples within the prediction block P are extrapolated downward at an angle of about 26.6° in a horizontal axis.
8) mode 7 (vertical-left): samples within the prediction block P are extrapolated to the left at an angle of about 26.6° in the vertical axis.
9) mode 8 (horizontal-up): samples within the prediction block P are interpolated upward at an angle of about 26.6° in the horizontal axis.

In FIGS. 4A to 4I, the arrow indicates a direction in which prediction is performed within each mode. Meanwhile, in relation to the mode 3 to the mode 8, the samples within the prediction block P are formed from a weighted average of the prediction samples A to H or I to L. For example, in the mode 4, a sample d placed on the right upper side of the prediction block P may be predicted as round (B/4+C/2+D/4). The encoder calculates the Sum of Absolute Errors (SAE) for a prediction block generated by each of the prediction modes and performs intra-prediction based on the prediction mode having the smallest SAE.

Figure 5:
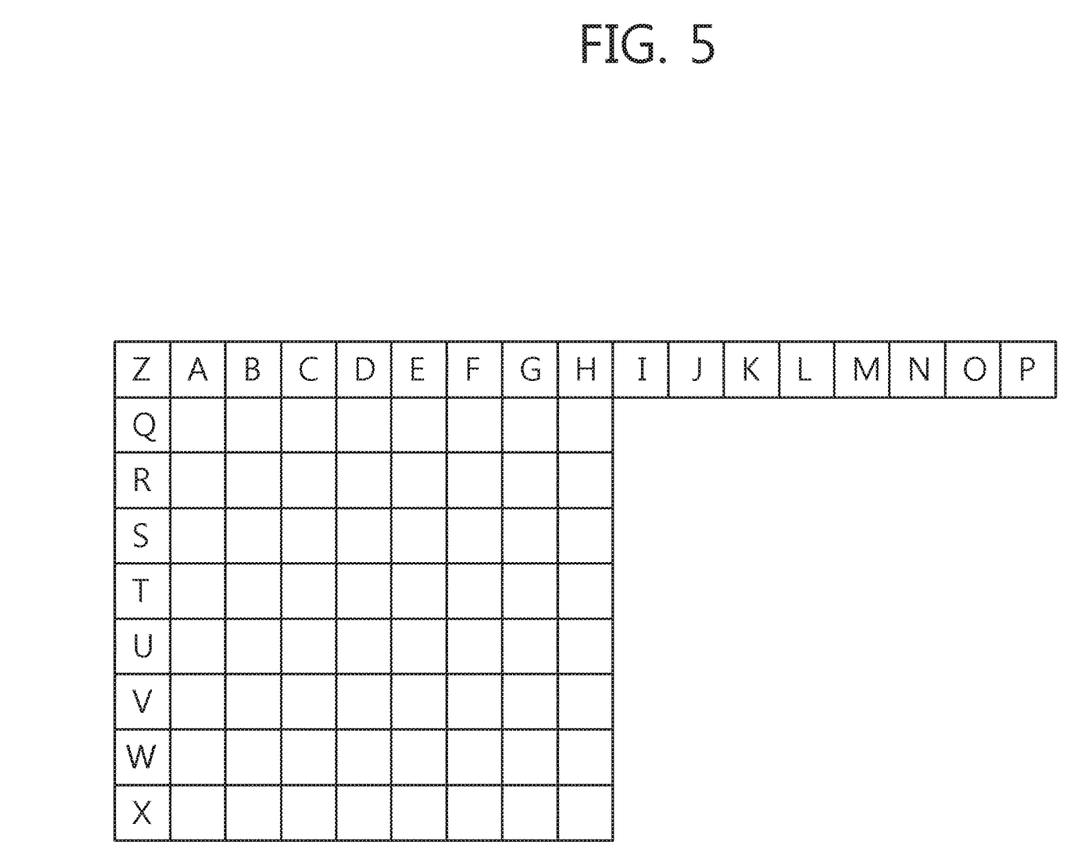
FIG. 5 is a diagram showing an example of a method of applying a filter before intra-prediction is performed.

FIG. 5 is a diagram showing an example of a method of applying a filter before intra-prediction is performed.

In general, a filter is applied to samples used in the H.264/AVC standard, and intra-prediction is then performed. The samples may also be called reference pixel values. In the example of FIG. 5, it is assumed that a filter is a low-pass filter and is applied to only an 8×8 block.

Equation 1 is an example of Equation showing a 3-tap filter applied to a reference pixel value.

$$h[Z] = (A + 2 \times Z + Q)/4 \qquad \text{<Equation 1>}$$
$$h[A] = (Z + 2 \times A + B)/4$$
$$\ldots$$
$$h[P] = (O + 3 \times P)/4$$
$$h[Q] = (Z + 2 \times Q + R)/4$$
$$\ldots$$
$$h[X] = (W + 3 \times X)/4$$

h[Z] indicates a value calculated by applying the filter to Z. Referring to Equation 1, filtering for the reference pixel value is performed by applying filter coefficients (1,2,1), and intra-prediction according to the 9 prediction modes is performed on the basis of reference pixel values h[A]~h[Z] that has been filtered. Like in the encoding process, the filter may be applied even in a decoding process.

In performing filtering before intra-prediction is performed, the performance of encoding may be improved when the filtering is not performed. Accordingly, a method of performing intra-prediction by adaptively applying the filter may be proposed.

Figure 6:
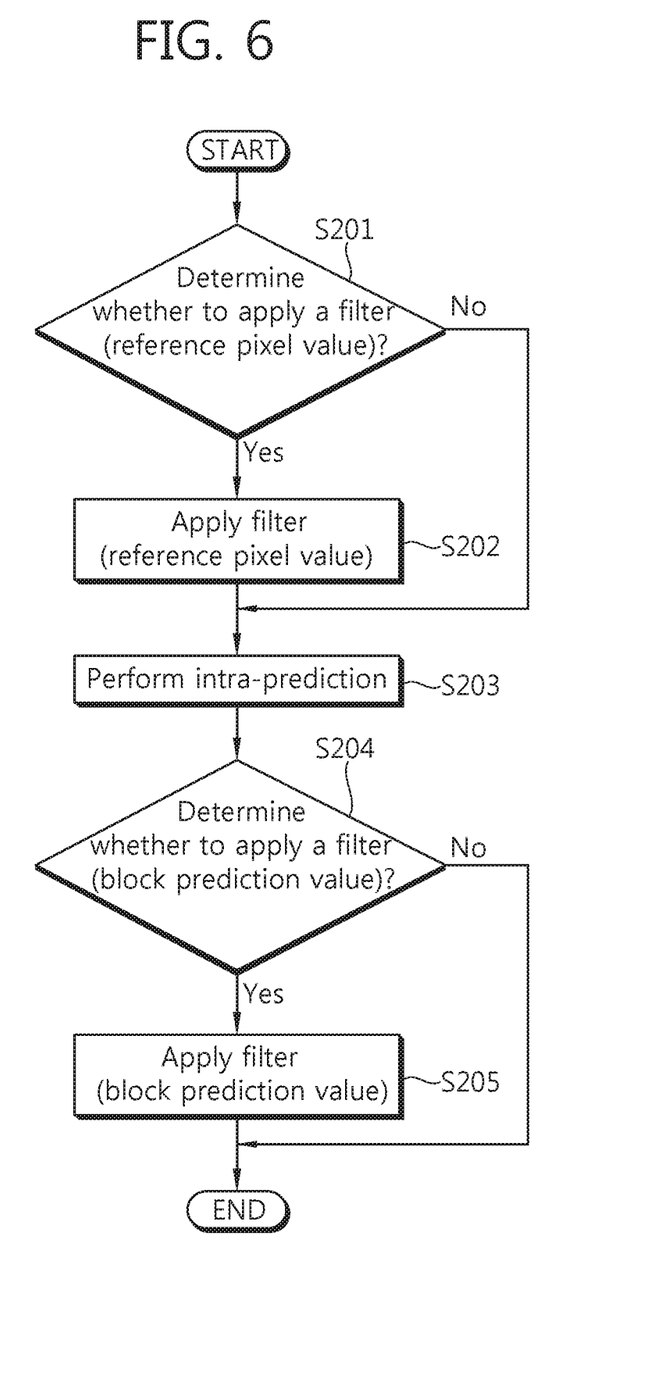
FIG. 6 is a diagram showing an embodiment of a proposed method of performing intra-prediction using an adaptive filter.

FIG. 6 is a diagram showing an embodiment of the proposed method of performing intra-prediction using an adaptive filter.

Referring to FIG. 6, at step S201, an encoder determines whether to apply the adaptive filter to a reference pixel value. When determining whether to apply the adaptive filter, the encoder may determine whether to apply the adaptive filter on the basis of information about a surrounding block or according to a Rate-Distortion Optimization (RDO) method.

When determining whether to apply the adaptive filter to the reference pixel value based on the information about a surrounding block, a prediction mode of a current block may be determined based on prediction mode information (i.e., a Most Probable Mode (MPM) about the surrounding block, and whether to apply the adaptive filter to the reference pixel value may be determined according to the determined prediction mode of the current block. For example, assuming that a current block is 'C', an upper block is 'A', and a left block is 'B', when a prediction mode of the current block is the same as a prediction mode of the upper block 'A', the prediction mode of the upper block 'A' may be determined as the prediction mode of the current block. When the prediction mode of the current block is the same as a prediction mode of the left block 'B', the prediction mode of the left block 'B' may be determined as the prediction mode of the current block. Alternatively, when the prediction mode of the current block is a prediction mode other than the prediction mode of the upper block 'A' or the prediction mode of the left block 'B', a relevant prediction mode is encoded and transmitted. Whether to apply the adaptive filter to the reference pixel value may be determined according to the prediction mode of the current block determined as described above. Even when the current block, the upper block, and the left block have different sizes, the prediction mode of a current block may be determined based on the prediction mode of a surrounding block.

Alternatively, in determining whether to apply the adaptive filter to the reference pixel value based on the information about a surrounding block, whether to apply the adaptive filter may be determined on the basis of a shift in the surrounding reference pixel value. For example, assuming that a reference pixel value to which the filter will be applied is p[n], a difference between p[n−1] and p[n+1] (i.e., surrounding reference pixel values) may be calculated, and whether to apply the filter may be determined by comparing the difference with a specific threshold.

Alternatively, whether to apply the filter to the reference pixel value may be determined based on the size of a current block other than a prediction mode of the current block. Here, whether to apply the filter is previously designated based on the prediction mode of the current block and the size of the current block, and whether to apply the filter is adaptively determined according to the relevant prediction mode or the relevant size.

Table 1 indicates whether to apply the filter according to the prediction mode of a current block and the size of the current block.

TABLE 1

| PREDICTION MODE OF | SIZE OF CURRENT BLOCK | | | |
|---|---|---|---|---|
| CURRENT BLOCK | 4 × 4 | 8 × 8 | 16 × 16 | 32 × 32 |
| 0 | 0 | 0 | 0 | 0 |
| 1 | 0 | 0 | 0 | 0 |
| 2 | 0 | 0 | 0 | 0 |
| 3 | 1 | 1 | 1 | 1 |
| 4 | 0 | 1 | 1 | 1 |
| . . . | . . . | . . . | . . . | . . . |

Referring to Table 1, '0' indicates that the filter is not applied, and '1' indicates that the filter is applied. For example, when the size of the current block is 4×4, if the prediction mode of the current block is 1, the filter may not be applied. If the prediction mode of the current block is 3, the filter may be applied.

Furthermore, whether to apply the filter to the reference pixel value may be determined according to whether surrounding blocks have been subjected to intra-frame encoding or inter-frame encoding. For example, when constrained intra-prediction is performed, a value subjected to the inter-frame encoding is filled with the value of a surrounding block subjected to intra-frame encoding when the surrounding block is subjected to the inter-frame encoding. Here, filter may not be applied.

If, as a result of the determination, the filter is determined to be applied to the reference pixel value, the encoder applies the filter to the reference pixel value at step S202. The applied filter may be a common filter. For example, the 3-tap filter of Equation 1 may be used, or a 2-tap filter may be used. When the 2-tap filter is used, various filter coefficients, such as (⅛, ⅞), (2/8, 6/8), and (⅜, ⅝), may be used. The reference pixel value to which the filter has been applied may be used when the filter is applied to other reference pixel values. Furthermore, when the filter is applied to the reference pixel value, the filter may be applied to all reference pixel values or only some of the reference pixel values.

At step S203, the encoder performs intra-prediction on the basis of the reference pixel value to which the filter has been applied or to which the filter has not been applied.

At step S204, the encoder determines whether to apply the filter to a prediction value for each prediction mode, predicted by performing the intra-prediction, in order to encode a current block. Here, each prediction mode may be each of the 9 prediction modes in the 4×4 luma prediction mode. When determining whether to apply the filter to a prediction value for each prediction mode, whether to apply the filter may be determined based on information about a surrounding block or according to the RDO method.

When determining whether to apply the filter to the prediction value based on the information about a surrounding block, a prediction mode of the current block may be determined based on prediction mode information (MPM) about the surrounding block, and whether to apply the filter to the prediction value may be determined based on the determined prediction mode of the current block. For example, assuming that a current block is 'C', an upper block is 'A', and a left block is 'B', when a prediction mode of the current block is the same as a prediction mode of the upper block 'A', the prediction mode of the upper block 'A' may be determined as the prediction mode of the current block. When the prediction mode of the current block is same as a prediction mode of the left block 'B', the prediction mode of the left block 'B' may be determined as the prediction mode of the current block. Alternatively, when the prediction mode of the current block is a prediction mode other than the prediction mode of the upper block 'A' or the prediction mode of the left block 'B', a relevant prediction mode is encoded and transmitted. Here, when the prediction mode of the current block is a specific prediction mode (DC or planar), a difference between a reference pixel value and a prediction value may be relatively greater than that of other prediction modes. For example, a difference between a reference pixel value and a prediction value in the planar prediction mode may be relatively greater than that of other prediction modes. The prediction value in the planar prediction mode may be calculated by averaging a first prediction value, obtained by horizontally performing linear interpolation for each row, and a second prediction value obtained by vertically performing linear interpolation for each column. When the linear interpolation is horizontally performed, a right value is the same as a value placed at a right upward position (i.e., D in FIG. 3), from among the reference pixel values. When the linear interpolation is vertically performed, a downward value is the same as a value placed at a left downward position (i.e., L in FIG. 3), from among the reference pixel values. Since the prediction value is not directly obtained from the reference pixel value, a difference between the reference pixel value and the prediction value may be relatively great. In this case, intra-prediction efficiency may be increased by applying the filter to the prediction value. Whether to apply the filter to the prediction value may be determined according to the prediction mode of the current block determined as described above. Even when a current block, an upper block, and a left block have different sizes, a prediction mode of the current block may be determined according to the prediction mode of a surrounding block.

Alternatively, whether to apply the filter to the prediction value may be determined according to the size of a current block besides the prediction mode of a current block. Here, whether to apply the filter according to the prediction mode of the current block and the size of the current block is previously designated, and whether to apply the filter is adaptively determined according to the relevant prediction mode or the relevant size. Alternatively, whether to apply the filter to the prediction value may be determined according to whether surrounding blocks have been subjected to intra-frame encoding or inter-frame encoding.

If, as a result of the determination, the filter is determined to have been applied to the prediction value, the encoder applies the filter to the prediction value at step S205. Accordingly, the prediction of the current block is completed, and the encoder calculates a residual signal and performs entropy coding.

Figure 7:
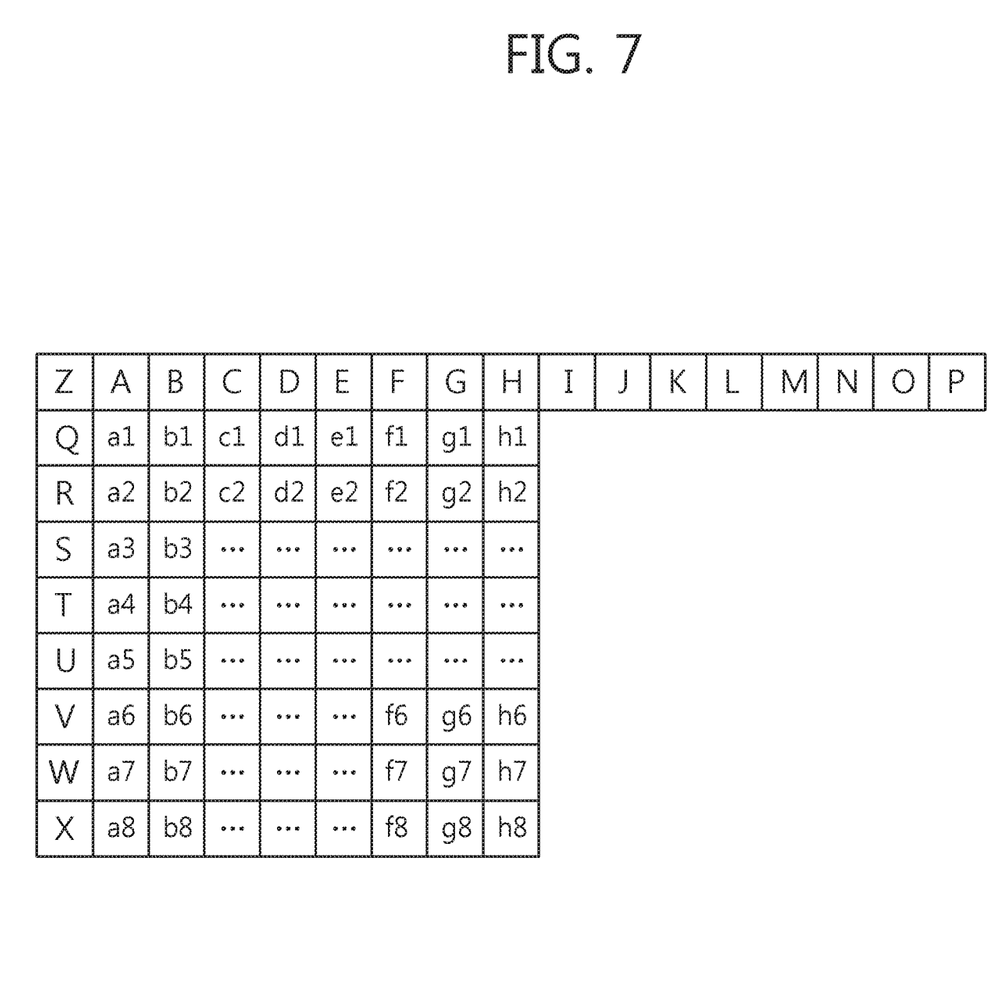
FIG. 7 is a diagram showing an example in which a filter is applied to a prediction value according to the proposed method of performing intra-prediction using the adaptive filter.

FIG. 7 is a diagram showing an example in which the filter is applied to the prediction value according to the proposed method of performing intra-prediction using the adaptive filter.

Referring to FIG. 7, in the case where the prediction mode of a current block is a non-directional mode, a difference between a reference pixel value and a prediction value may become relatively greater than that of other prediction modes. Accordingly, the filter may be applied to only the prediction values of pixels adjacent to the boundary with surrounding restored reference pixel values. For example, filtering may be performed for prediction values corresponding to a1~a8, and b1, c1, d1, e1, f1, g1, and h1 corresponding to the pixels of one line which is placed at the boundary in FIG. 7. Alternatively, filtering may be performed for prediction values corresponding to a1~a8, b1~b8, and c1~c2, d1~d2, e1~e2, f1~f2, g1~g2, and h1~h2 corresponding to the pixels of two lines which are placed at the boundary in FIG. 7. Here, the applied filter may be a common filter. For example, the 3-tap filter of Equation 1 may be used or a 2-tap filter may be used. When the 2-tap filter is used, various filter coefficients, such as (1/8, 7/8), (2/8, 6/8), and (3/8, 5/8), may be used. Alternatively, any one of the 2-tap filter and the 3-tap filter may be selected and sued according to the positions of pixels.

In the case where the prediction mode of a current block is a prediction mode using the reference pixel values corresponding to A-P as in the mode 0, the mode 3, or the mode 7 in this way, the filter may be applied to prediction values which correspond to a1~a8 having a relatively great difference between the reference pixel value and the prediction value. Furthermore, in the case where the prediction mode of a current block is a prediction mode using the reference pixel values corresponding to Q-X as in the mode 1 or the mode 8, the filter may be applied to prediction values which correspond to a1, b1, c1, d1, e1, f1, g1, and h1 having a relatively great difference between the reference pixel value and the prediction value Equation 2 is an example of Equation, indicating the filter applied to prediction values when the 2-tap filter or the 3-tap filter is selected and used according to the positions of pixels.

$$f[a1] = (2 \times A + 4 \times a1 + 2 \times Q)/8 \qquad \text{<Equation 2>}$$
$$f[b1] = (2 \times B + 6 \times b1)/8$$
$$f[c1] = (2 \times C + 6 \times c1)/8$$
$$\ldots$$
$$f[a2] = (2 \times R + 6 \times a2)/8$$
$$f[a3] = (2 \times S + 6 \times a3)/8$$
$$\ldots$$

In Equation 2, f[a1] is a value in which the filter is applied to the prediction value a1, and A and Q indicate the reference pixel values. From Equation 2, it can be seen that the 3-tap filter is applied to the prediction value of a pixel where the prediction value a1 is placed, and the 2-tap filter is applied to the prediction values of remaining pixels.

Equation 3 is another example of Equation, indicating the filter applied to prediction values when the filter is applied to the prediction values according to the proposed method of performing intra-prediction using the adaptive filter.

1. Vertical low-pass filter                          <Equation 3>

$$v[a1] = (A + 2 \times a1 + a2)/4$$
$$v[a2] = (v[a1] + 2 \times a2 + a3)/4$$
$$\ldots$$
$$v[a8] = (v[a7] + 3 \times a8)/4$$
$$v[b1] = (B + 2 \times b1 + b2)/4$$
$$\ldots$$

2. Horizontal low-pass filter $$h[a1] = (Q + 2 \times v[a1] + v[b1])/4$$
$$h[b1] = (h[a1] + 2 \times v[b1] + v[c1])/4$$
$$\ldots$$
$$h[h1] = (h[g1] + 3 \times v[h1])/4$$
$$h[a2] = (R + 2 \times v[a2] + v[b2])/4$$
$$\ldots$$

In Equation 3, the filter may be used when the adaptive filter is applied according to the method using information about surrounding blocks or the RDO method for each of the prediction modes. Referring to Equation 3, a low-pass filter having filter coefficients (1, 2, 1) is sequentially applied to two vertical and horizontal directions. First, the filter is applied to the vertical direction, and the filter is applied to the horizontal direction based on a prediction value to which the filter has been applied. The prediction value to which the filter has been applied may be used when the filter is applied to other prediction values.

Meanwhile, when the RDO method is used, the method of performing intra-prediction described with reference to FIG. 6 may be repeatedly performed.

Figure 8:
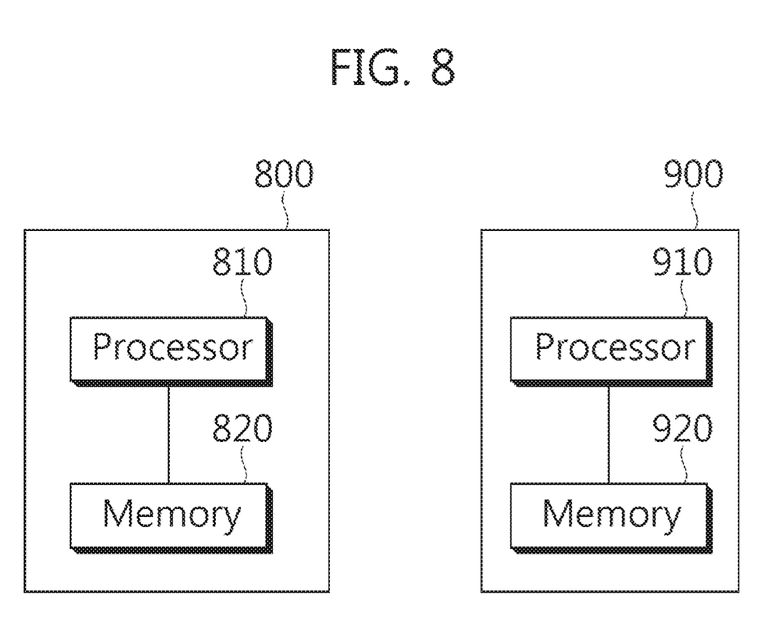
FIG. 8 is a block diagram of an encoder and a decoder in which the embodiments of the present invention are implemented.

FIG. 8 is a block diagram of an encoder and a decoder in which the embodiments of the present invention are implemented.

The encoder 800 includes a processor 810 and memory 820. The processor 810 implements the proposed functions, processes, and/or methods. The processor 810 is configured to determine whether to apply a first filter to reference pixel values based on information about surrounding blocks of a current block, apply the first filter to the reference pixel values if, as a result of the determination, the first filter is determined to be applied, perform intra-prediction for the current block on the basis of the reference pixel values, determine whether to apply a second filter to a prediction value for each prediction mode of the current block which has been predicted by performing the intra-prediction based on the information about surrounding blocks, and apply the second filter to the prediction value for each prediction mode of the current block if, as a result of the determination, the second filter is determined to be applied. The memory 820 is connected to the processor 810 and is configured to store various pieces of information for driving the processor 810.

The decoder 900 includes a processor 910 and memory 920. The processor 910 implements the proposed functions, processes, and/or methods. The processor 910 is configured to determine whether to apply a first filter to reference pixel values based on information about surrounding blocks of a current block, apply the first filter to the reference pixel values if, as a result of the determination, the first filter is determined to be applied, perform intra-prediction for the current block on the basis of the reference pixel values, determine whether to apply a second filter to a prediction value for each prediction mode of the current block which has been predicted by performing the intra-prediction based on the information about surrounding blocks, and apply the second filter to the prediction value for each prediction mode of the current block if, as a result of the determination, the second filter is determined to be applied. The memory 920 is connected to the processor 910 and is configured to store various pieces of information for driving the processor 910.

The processor 810, 910 may include Application-Specific Integrated Circuits (ASICs), other chipsets, logic circuits, and/or data processors. The memory 820, 920 may include Read-Only Memory (ROM), Random Access Memory (RAM), flash memory, a memory card, a storage medium, and/or other storage devices. When the above embodiments are implemented in software, the above schemes may be implemented using a module (or a process or function) for performing the above functions. The module may be stored in the memory 820, 920 and may be executed by the processor 810, 910. The memory 820, 920 may be internal or external to the processor 810, 910 and may be coupled to the processor 810, 910 using a variety of well-known means.

In the above-described exemplary systems, although the methods have been described on the basis of the flowcharts using a series of steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of illustrations. Although all kinds of possible combinations for representing the various aspects may not be described, a person having ordinary skill in the art will understand that other possible combinations are possible. Accordingly, the present invention may be said to include all other replacements, modifications, and changes belonging to the accompanying claims.

The invention claimed is:

1. A video decoding method, comprising:
   determining whether to apply a first filter to a reference pixel value of a current block based on at least one of an intra prediction mode of the current block and a size of the current block;
   deriving a prediction value of the current block using the reference pixel value; and
   determining whether to apply a second filter for the prediction value of the current block based on at least one of an intra prediction mode of the current block and a size of the current block, for thereby producing a filtered prediction value,
   wherein the intra prediction mode of the current block is determined based on a Most Probable Mode (MPM), and
   wherein when the intra prediction mode of the current block is a DC mode, the filtered prediction value is generated by applying a 3-tap filter for an upper-leftmost pixel of the current block among prediction pixels of the current block and applying a 2-tap filter for remaining uppermost pixels and leftmost pixels except the upper-leftmost pixel among prediction pixels of the current block.

2. The video decoding method of claim 1, wherein the upper-leftmost pixel corresponds to a first filter coefficient and the remaining uppermost pixels and leftmost pixels except for the upper-leftmost pixel correspond to a second filter coefficient, wherein the second filter coefficient is 1.5 times larger than the first filter coefficient.

3. A video encoding method comprising:
   encoding information related to whether to apply a first filter to a reference pixel value of a current block and whether to apply a second filter for a prediction value of the current block,
   wherein the information is related to at least one of an intra prediction mode of the current block and a size of the current block,
   wherein the intra prediction mode of the current block is encoded based on a Most Probable Mode (MPM), and
   wherein when the intra prediction mode of the current block is a DC mode, the filtered prediction value is generated by applying a 3-tap filter for an upper-leftmost pixel of the current block among prediction pixels of the current block and applying a 2-tap filter for remaining uppermost pixels and leftmost pixels except the upper-leftmost pixel among prediction pixels of the current block.

4. The video encoding method of claim 3,
   wherein the upper-leftmost pixel corresponds to a first filter coefficient and the remaining uppermost and leftmost pixels except the upper-leftmost pixel correspond to a second filter coefficient, wherein the second filter coefficient is 1.5 times larger than the first filter coefficient.

5. A non-transitory computer-readable storage medium storing a bitstream, the bitstream comprising:
   information related to whether to apply a first filter for a reference pixel value of a current block and whether to apply a second filter to a prediction value of the current block,
   wherein the information is related to at least one of an intra prediction mode of the current block and a size of the current block,
   wherein the intra prediction mode of the current block is encoded based on a Most Probable Mode (MPM), and wherein when the intra prediction mode of the current block is a DC mode, the filtered prediction value is generated by applying a 3-tap filter for an upper-leftmost pixel of the current block among prediction pixels of the current block and applying a 2-tap filter for remaining uppermost pixels and leftmost pixels except the upper-leftmost pixel among prediction pixels of the current block.

\* \* \* \* \*